United States Patent [19]

Tadokoro et al.

[11] 4,425,883
[45] Jan. 17, 1984

[54] INTAKE MEANS FOR TWO-ROTOR TYPE ROTARY PISTON ENGINES

[75] Inventors: Tomoo Tadokoro; Nobuhiro Hayama; Toshimichi Akagi, all of Hiroshima, Japan

[73] Assignee: Toyo Kogyo Co., Ltd., Hiroshima, Japan

[21] Appl. No.: 283,685

[22] Filed: Jul. 15, 1981

[30] Foreign Application Priority Data

Jul. 16, 1980 [JP] Japan .................... 55-97863

[51] Int. Cl.³ ........................................ F02B 53/06
[52] U.S. Cl. ................................ 123/242; 123/216
[58] Field of Search ............ 123/216, 219, 242, 393

[56] References Cited

U.S. PATENT DOCUMENTS

| | | | |
|---|---|---|---|
| 2,722,926 | 11/1955 | Bradnick | 123/393 |
| 3,476,092 | 11/1969 | Yamamoto | 123/216 |
| 3,827,408 | 8/1974 | Ishikawa | 123/216 |
| 3,934,558 | 1/1976 | Wilmers | 123/242 |
| 4,030,454 | 6/1977 | Yamamoto et al. | 123/219 |
| 4,315,488 | 2/1982 | Tadokoro et al. | 123/216 X |

*Primary Examiner*—Michael Koczo
*Attorney, Agent, or Firm*—Fleit, Jacobson, Cohn & Price

[57] ABSTRACT

A two rotor type rotary piston engine including a casing comprised of a pair of rotor housings connected together with an intermediate housing interposed therebetween and side housings attached to the outer sides of the rotor housings to define rotor cavities. A substantially triangular rotor is disposed in each rotor cavity. The intake system includes a light load intake port formed in the intermediate housing so as to open to each rotor cavity, a medium load and heavy load intake ports formed in each side housing. The light load and medium load intake ports are formed so that they are opened to a working chamber after the chamber is disconnected from the exhaust port and closed substantially simultaneously. The heavy load intake port is associated with a control valve which is closed under light and medium load operations.

6 Claims, 5 Drawing Figures

INTAKE MEANS FOR TWO-ROTOR TYPE ROTARY PISTON ENGINES

The present invention relates to rotary piston engines and more particularly to two-rotor type rotary piston engines. More specifically, the present invention pertains to an intake system for two-rotor type rotary piston engines.

Conventional rotary piston engines include a casing comprised of a rotor housing having a trochoidal inner wall and a pair of side housings attached to the opposite sides of the rotor housing to define a rotor cavity therein, and a substantially polygonal rotor disposed in the casing for rotation with apex portions in sliding engagement with the inner wall of the rotor housing to define working chambers of variable volumes to conduct intake, compression, combustion, expansion and exhaust strokes. In two-rotor type rotary piston engines, one of the side housings is used in common and located between the two rotors. Such side housing is generally called a center or intermediate housing.

The casings are formed with exhaust and intake ports which open respectively to the working chambers in the exhaust and intake strokes. The exhaust ports are usually formed in the rotor housings and the intake ports in either or both of the rotor and side housings. In conventional rotary piston engines, the exhaust and intake ports are so located that there is an overlap period wherein the ports are opened simultaneously to the same working chamber. In this arrangement, problems have been encountered in that the combustion gas in the exhaust port is at first drawn under the intake suction pressure through the intake port into the intake passage and then back into the working chamber in the intake stroke as the volume of the working chamber increases. The combustion gas thus taken into the intake working chamber dilutes the intake mixture possibly producing misfire. This causes rough engine operations and an increase in the amount of pollutant emissions in the exhaust gas. The adverse effect of the overlap is particularly significant in idling and light load engine operations wherein the charge of the intake mixture is relatively small.

It has therefore been conventional practice to supply comparatively rich air-fuel mixture of small air-fuel ratio in the idling and light load conditions to obtain a stable operation. However, the solution has not been satisfactory because fuel consumption cannot be decreased to a level that can meet the requirement in recent years. Efforts may therefore be made to eliminate the aforementioned overlap period.

In rotary engines of a peripheral port type having intake ports formed in the rotor housings, however, it is extremely difficult to arrange the intake and exhaust ports so that the overlap can be avoided. In a side port type wherein the intake ports and formed in the side housings, it is possible to arrange the intake ports so that the overlap can be avoided, however, in such arrangements, the opening areas of the intake ports are limited in various respects and it becomes impossible to supply a sufficient amount of intake mixture to meet the high output requirement.

More specifically, in an intake port formed in the side housing, the radially inner edge of the port must be outside the trace of the oil seal carried by the rotor. The location of the radially outer edge is determined by the port opening timing, whereas the location of the leading side edge as seen in the direction of rotor rotation is determined by the port closing timing. Thus, in order to avoid the overlap between the intake and exhaust ports, the radially outer edge of the intake port must be located radially inwardly as compared with conventional intake ports. This will cause a decrease in the port area and in order to compensate for such a decrease in the port area, the location of the leading edge must be changed so that the port closing time is delayed. However, a delay in the intake port closing timing will cause a blow back of the intake mixture into the intake passage, particularly in heavy load, low speed engine operations, to thereby cause a decrease in the intake charge and consequently a decrease in the compression pressure in the working chamber.

It is therefore an object of the present invention to provide an intake system for a two-rotor type rotary piston engine in which the overlap between the exhaust and intake ports can be eliminated without causing substantial decrease in the port area.

Another object of the present invention is to provide an intake system for a two-rotor type rotary piston engine in which the intake port area can in effect be changed in accordance with the engine load.

According to the present invention, the above and other objects can be accomplished by a rotary piston engine including a casing comprised of a pair of rotor housings each having a trochoidal inner wall and secured together at one side thereof with an intermediate housing disposed therebetween and a side housing secured to the other side of each rotor housing to define a rotor cavity in each of the rotor housings between the intermediate and side housings, a substantially polygonal rotor disposed in each rotor cavity for rotation with apex portions in sliding engagement with the inner wall of the associated rotor housing to define working chambers of variable volumes to conduct intake, compression, combustion, expansion and exhaust strokes, exhaust port means formed in said casing so as to open to each rotor cavity at the working chamber in the exhaust stroke, first intake port means formed in said intermediate housing so as to open to each rotor cavity at the working chamber in the intake stroke, said first intake port means is located so that it is opened to the working chamber after the same working chamber is substantially disconnected from the exhaust port means, second intake port means formed in each side housing so as to open through at least one opening to each rotor cavity at the working chamber in the intake stroke and located so that it is disconnected from the same working chamber later than the first intake port means, said second intake port means being associated with control valve means which closes the second intake port means in light load engine operation.

According to the features of the present invention, only the first intake port means is used to draw the intake mixture into the working chamber under a light load engine operation. Since the first intake port means is located so that there is no overlap period wherein the exhaust and intake port means are opened simultaneously to the same working chamber, there is no risk that the exhaust gas in the exhaust port means is drawn into the intake port means. It is therefore possible to prevent or at least significantly decrease the dilution of the intake mixture by the exhaust gas. In heavy load operation and possibly in medium load operation, the valve means is opened and a sufficient amount of intake mixture can be drawn to meet the output requirement.

According to a further feature of the present invention, each side housing may further be formed with third intake port means which opens to the rotor cavity at the working chamber in the intake stroke and located so that it is opened to the working chamber after the same working chamber is substantially disconnected from the exhaust port means and closed substantially simultaneously with the first intake port means. Where a dual barrel type carburetor is used, the primary passage of the carburetor may be connected with the first intake port means and the secondary passage with the second and third intake port means. With this arrangement, it becomes possible to change the intake port area in three stages in accordance with the engine load.

The above and other objects and features of the present invention will become apparent from the following descriptions of a preferred embodiment taking reference to the accompanying drawings, in which.

Figure 1:
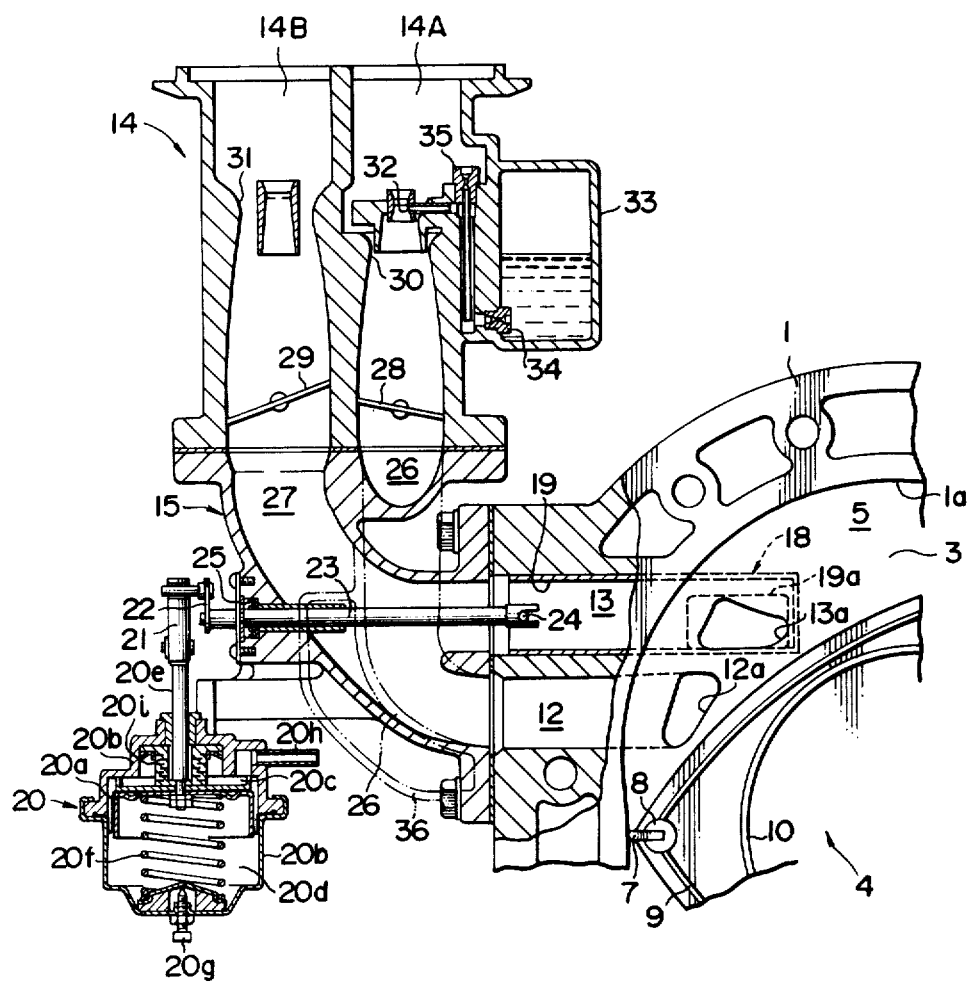
FIG. 1 is a fragmentary sectional view of a rotary piston engine in accordance with one embodiment of the present invention.
Figure 4:
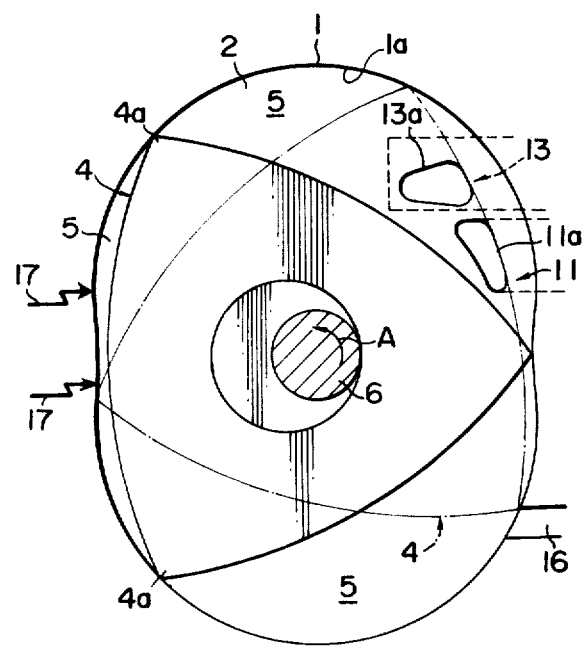
FIG. 4 is a diagrammatical illustration of a rotary piston engine showing the port arrangement; and, FIG. 5 is a longitudinal sectional view of the rotary piston engine.

Referring now to the drawings, there is shown a two-rotor type rotary piston engine including a pair of rotor housings 1 which are secured together with an intervention of an intermediate housing 2. At the outer side of each rotor housing 1, there is attached a side housing 3 so as to define a rotor cavity with the rotor and intermediate housings. Each rotor housing 1 has an inner wall 1a which is of a trochoidal configuration as shown in FIG. 4. In each rotor cavity, there is disposed a substantially triangular rotor 4 for rotation with apex portions 4a in sliding contact with the inner wall 1a of the rotor housing 1 so as to define working chambers 5 of variable volume to conduct an intake, compression, combustion, expansion and exhaust strokes. The rotors 4 are carried by an eccentric shaft 6 with 180° phase difference between each other. On the apex portions 4a of the rotors 4, there are provided apex seals 7 as well known in the art. Further, the rotors 4 are also provided with corner seals 8, side seals 9 and oil seals 10 as shown in FIG. 1.

Figure 5:
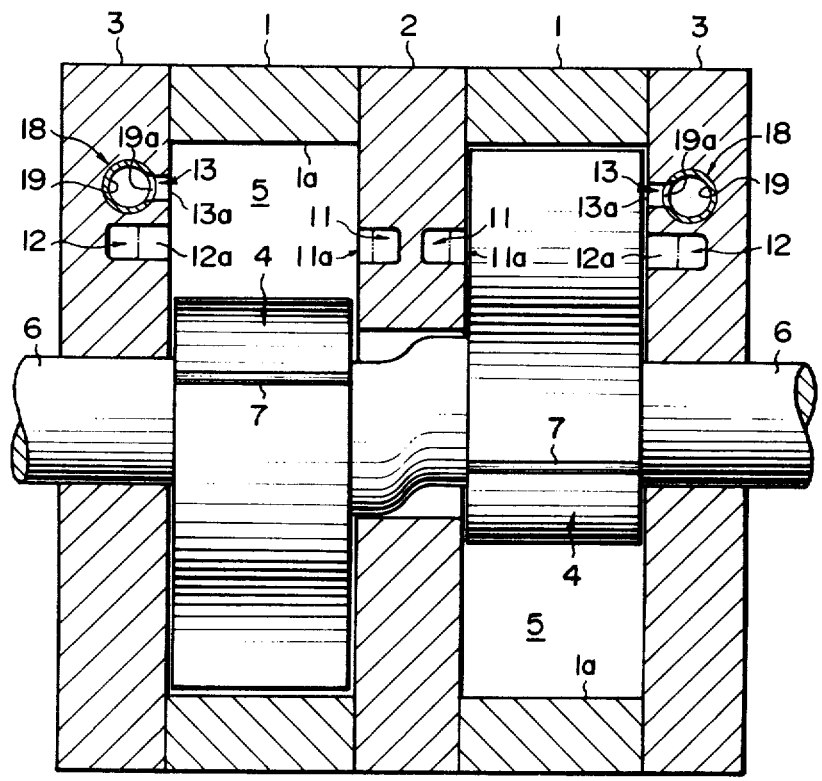

As shown in FIG. 5, the intermediate housing 2 is formed at the opposite sides with light load intake ports 11 which open through the openings 11a to the respective rotor cavities at the working chambers 5 which are in the intake stroke. Each of the side housings 3 is formed with an intermediate load intake port 12 which is opened through an opening 12a to the associated rotor cavity at the working chamber 5 in the intake stroke. The side housing 3 is further formed with a heavy load intake port 13 which opens through an opening 13a to the rotor cavity at the intake working chamber 5.

The openings 11a, 12a and 13a of the intake ports 11, 12 and 13 are located so that they are cyclically closed by the side surfaces of the rotor 4. As shown in FIG. 4, the rotor housing 2 is formed with an exhaust port 16 which opens to the rotor cavity at the working chamber 5 in the exhaust stroke. Further, ignition plugs 17 are mounted on the rotor housing 1 as well known in the art. In FIG. 4, the rotor 4 rotates counterclockwise as shown by an arrow A. The opening 11a of the light load intake port 11 is located so that it is opened to the intake working chamber 5 after the same chamber is disconnected from the exhaust port 16 and closed at a relatively earlier stage so that the blow back of the intake mixture to the intake port 11 can be prevented. The opening 12a of the intermediate load intake port 12 is of the same configuration as the opening 11a and located so that it is opened and closed substantially at the same timings as the opening 11a. The opening 13a of the heavy load intake port 13 is located so as to be closed after the ports 11a and 12a are closed. The opening 13a may be so formed that it is opened substantially at the same time as the openings 11a and 12a or it may be opened earlier than the openings 11a and 12a.

In the illustrated embodiment, the engine has a dual-barrel type carburetor 14 which includes a primary passage 14A and a secondary passage 14B. The carburetor 14 is mounted on the engine casing through a manifold assembly 15 having primary intake passages 26 and secondary intake passages 27 which are respectively connected with the passages 14A and 14B in the carburetor 14. The primary passage 14A in the carburetor 14 is provided with a primary throttle valve 28 and the secondary passage 14B with a secondary throttle valve 29. In the primary passage 14A, there is formed a primary venturi portion 30 in which a main fuel nozzle assembly 32 is provided as in conventional carburetors. The main fuel nozzle assembly 32 is connected through an air blead device 35 and a main jet 34 with a float chamber 33. The secondary passage 14B is formed with a secondary venturi portion 31 which may have a fuel nozzle assembly although not shown in FIG. 1. As well known in the art, the secondary throttle valve 29 starts to open after the primary throttle valve 28 has been substantially fully opened or under medium and heavy load operations.

The primary passage 14A of the carburetor 14 is connected through the passages 26 in the manifold assembly 15 with the openings 11a of the intake ports 11. In the illustrated embodiment, the passages 26 is provided with a preheating passage 36 having an inlet 36a and an outlet 36b through which the engine cooling liquid is passed. The secondary passage 14B is connected through the passages 27 in the manifold assembly 15 with the openings 12a and 13a of the intake ports 12 and 13. The heavy load intake port 13 is provided adjacent to the opening 13a with a control valve 18 which includes a hollow cylindrical valve member 19 rotatably inserted into a cylindrical bore formed in the intake port 13. The valve member 19 has an aperture 19a which is aligned with the opening 13a as shown in FIG. 1 when the valve member 19 is in the position shown in FIG. 1 but disconnected from the opening 13a when the valve member 19 is rotated.

In order to axially move the cylindrical valve member 19, there is provided an actuator 20 which is comprised of a casing 20b having a diaphragm 20a for dividing the interior of the casing 20b into a pressure chamber 20c and an atmospheric pressure chamber 20d. The diaphragm 20a is connected with a push-pull rod 20e which is in turn connected through a link 21 and a lever 22 with an actuating rod 23 so that the axial movement of the rod 20e is converted into a rotation of the actuating rod 23. The actuating rod 23 is connected with the valve member 19 by means of a pin 24 so that the rotation of the actuating rod 23 is transmitted to the valve member 19. A gas seal 25 is provided between the intake manifold 15 and the actuating rod 23.

In the atmospheric pressure chamber 20d of the actuator 20, there is provided a compression spring 20f which biases the diaphragm 20a upwardly so that the valve member 19 is forced toward the position wherein the aperture 19a in the valve member 19 is disconnected from the opening 13a to thereby close the intake port 13. The force of the spring 20f can be adjusted by the adjusting screw 20g. The pressure chamber 20c is connected with an exhaust gas pressure pipe 20h which introduces the exhaust gas pressure into the chamber 20c. In the pressure chamber 20c, there is provided a solid type bellows 20i which has circumferential slits formed alternately in inner and outer peripheries thereof. The bellows 20i encircles the rod 20e and attached at one end to the casing 20b and at the other to the diaphragm 20a to thereby provide an expansible seal.

In idling or light load operations, the secondary throttle valve 29 of the carburetor 14 is closed so that there is no supply of intake mixture to the passage 27 leading to the intake ports 12 and 13. In this instance, the exhaust gas pressure is small so that the diaphragm 20a in the actuator 20 is forced under the influence of the spring 20f to maintain the control valve 19 in the closed position. Since the control valve 19 is located close to the opening 13a, the dead volume in the port 13 is very small. Therefore, it is possible to decrease carrying over of the exhaust gas through the port 13. The intake mixture is supplied to the working chambers 5 only through the intake ports 11. Since the intake port 11 is so located that it is opened to the working chamber 5 after the same working chamber 5 is disconnected from the exhaust port 16, it is possible to eliminate or substantially decrease carrying over of the exhaust gas into the intake working chamber 5 due to the overlap between the intake and exhaust ports. The intake port 12 has the identical configuration with and located in the same manner as the port 11. Therefore, it is also possible to eliminate the carrying over of the exhaust gas through the intake port 12. Further, only one intake port 11 of a relatively small area is used for one rotor cavity so that it is possible to maintain a relatively high flow speed of the intake mixture to thereby provide an improved atomization and vaporization of fuel even under such idling or light load engine operations. Thus, it becomes possible to obtain stable combustion even with a relatively lean mixture and consequently fuel consumption can be significantly reduced.

In medium load operation, the secondary throttle valve 29 of the carburetor 14 is opened but the exhaust gas pressure is still low so that the control valve 18 is maintained in the closed position. The intake mixture is supplied through the intake ports 11 and 12. Thus, a sufficient amount of intake mixture can be supplied to meet the demand under the medium load operation.

Figure 2:
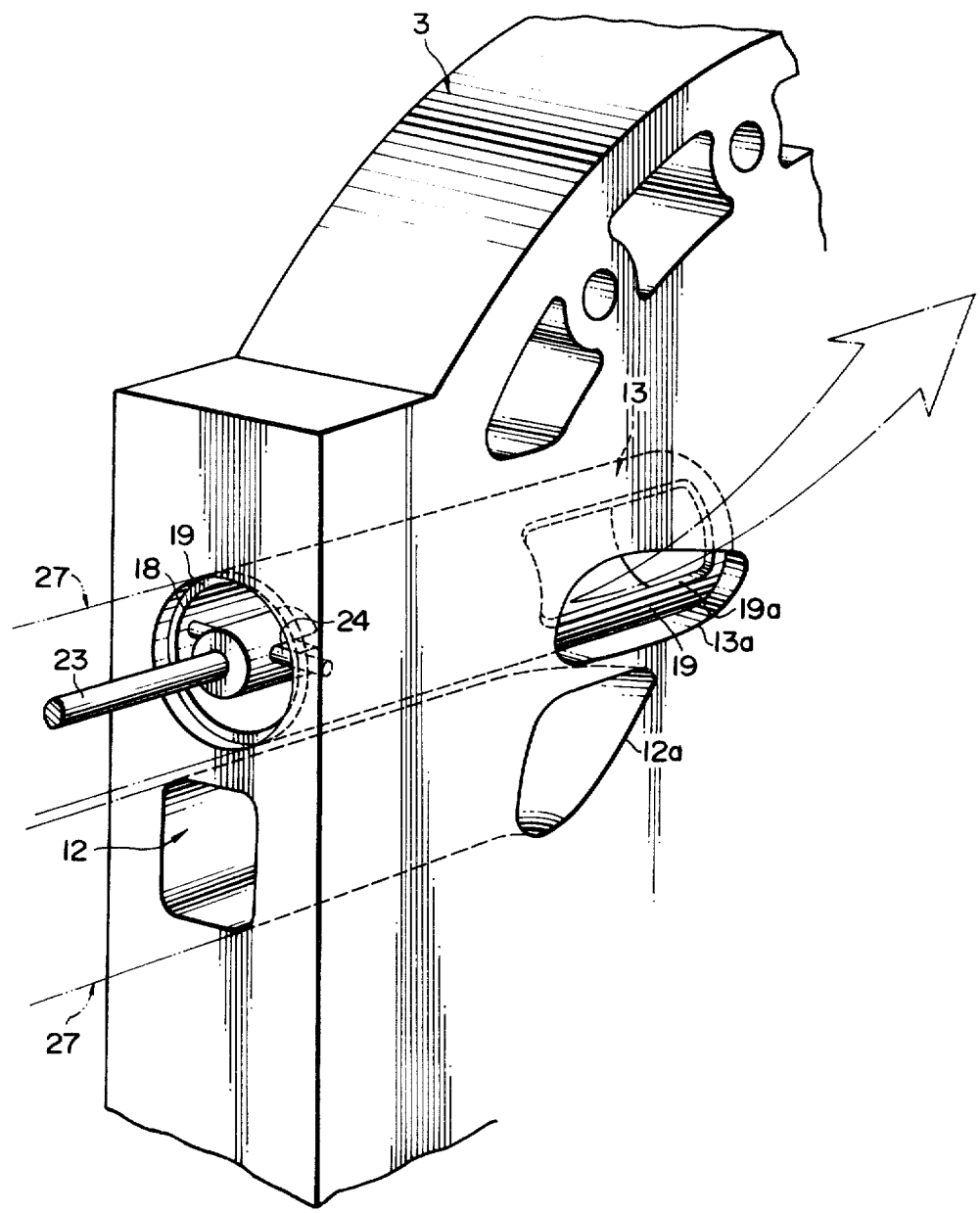
FIG. 2 is a fragmentary perspective view of a side housing formed with intake ports in accordance with the present invention.
Figure 3:
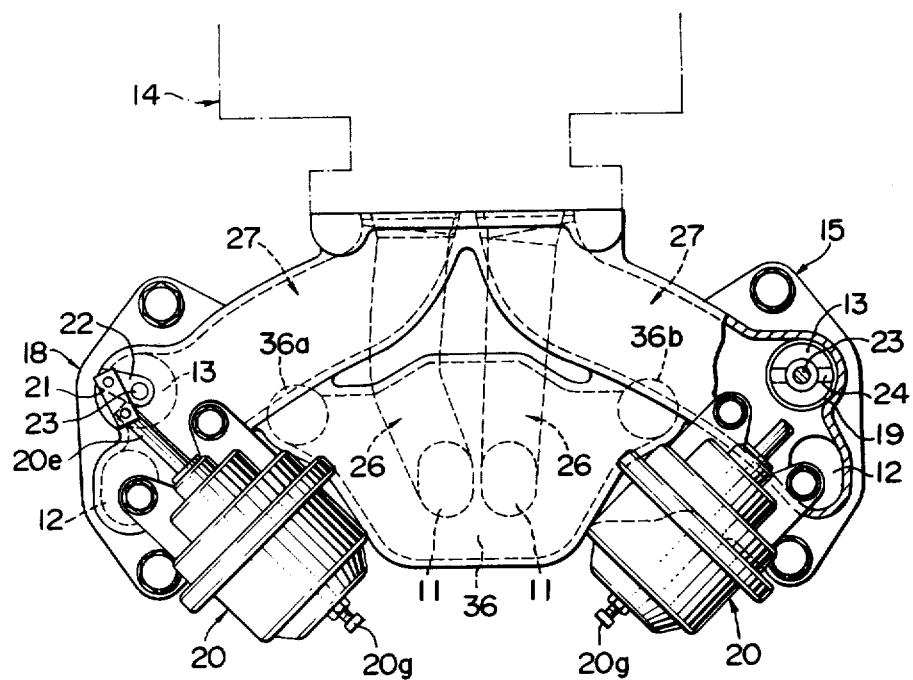
FIG. 3 is a front view of the rotary piston engine particularly showing the intake manifold assembly.

In heavy load operation, the secondary throttle valve 29 of the carburetor 14 is further opened and the exhaust gas pressure is increased beyond the valve wherein the diaphragm 20a is moved against the influence of the spring 20f to actuate the valve member 19 to the open position wherein the aperture 19a in the valve member 19 is aligned with the port opening 13a. Thus, the intake mixture is supplied through all of the ports 11, 12 and 13. As shown in FIG. 2, in the illustrated embodiment, the arrangement is such that the port opening 13a starts to open at the leading side thereof as the valve member 19 is moved toward the fully open position. In the partially open position shown in FIG. 2, the intake mixture is therefore discharged toward the leading direction as shown by an arrow and provide a highly combustible atmosphere around the ignition plugs 17.

It will therefore the understood that a large amount of intake mixture is supplied under a heavy load operation through all of the intake ports 11, 12 and 13 to provide a high output power. It should be noted that the heavy load intake port 13 is so formed that it is closed later than the ports 11 and 12 to provide a sufficient amount of charge. The closing timing of the heavy load intake port 13 must be determined taking into consideration the problem of blow back of the intake mixture into the intake port. In the illustrated embodiment, the port timing can be controlled to a most suitable valve for providing an optimum output power under or heavy load, high speed operation since the control valve 18 is actuated by the exhaust gas pressure which corresponds to the load and speed of the engine.

In the illustrated embodiment, it is preferable to provide the outer surface of the cylindrical valve member 19 and/or the inner surface of the cylindrical bore in the intake port 13 with a coating of a fluorinated resin such as Teflon for the purpose of providing a satisfactory lubrication. In order to eliminate possible seizure of the valve member 19 in the cylindrical bore, it is recommendable to open the valve 18 under starting and decelerating operations because in such operations, the intake port 13 does not have any adverse effect. The aperture 19a in the valve member 19 should preferably be larger than the port opening 13a. The actuator for the control valve 18 may be of any type and may be operated by any signal which represents the engine load. For example, the engine intake pressure and the throttle valve position may be used alone or in combination with the engine speed.

The arrangement of the illustrated embodiment employing the valve actuator operated by the exhaust gas pressure is preferable because the heavy load intake port 13 is opened only under the heavy load, high speed operation. Under a heavy load, low speed operation, a sufficient amount of charge may be provided only through the ports 11 and 12 and closing the control valve 18 under such condition may be recommendable in order to avoid blow back of the intake mixture.

In the illustrated embodiment, the opening 13a of the heavy load intake port 13 is so located that it is opened to the working chamber 5 after the same working chamber 5 is disconnected from the exhaust port 16. However, the port opening 13a may be so formed that there is a certain overlap with the exhaust port 16. Since the intake port 13 is closed by the control valve 18 which is located close to the port opening 13a, the dead volume of the port 13 is very small and there will be no appreciable amount of carrying over of the exhaust gas even if there is a certain overlap between the heavy load intake port 13 and the exhaust port 16. It should further be noted that the fuel supply system may not necessarily be of a carburetor type as in the illustrated embodiment but may be of a fuel injection type.

The invention has thus been shown and described with reference to a specific embodiment, however, it should be noted that the invention is in no way limited to the details of the illustrated arrangements but changes and modifications may be made without departing from the scope of the appended claims.

We claim:

1. A rotary piston engine including a casing comprised of a pair of rotor housings each having a trochoidal inner wall and secured together at one side thereof with an intermediate housing disposed therebetween and a side housing secured to the other side of each rotor housing to define a rotor cavity in each of the rotor housings between the intermediate and side housings, a substantially polygonal rotor disposed in each rotor cavity for rotation with apex portions in sliding engagement with the inner wall of the associated rotor housing to define working chambers of variable volumes to conduct intake, compression, combustion, expansion and exhaust strokes, exhaust port means formed in said casing so as to open to each rotor cavity at the working chamber in the exhaust stroke, primary intake port means formed in said intermediate housing so as to open to each rotor cavity at the working chamber in the intake stroke, said primary intake port means being located so that it is opened to the working chamber after the same working chamber is substantially disconnected from the exhaust port means, secondary intake port means formed in each side housing so as to open to each rotor cavity at the working chamber in the intake stroke, said secondary intake port means being located so that it is opened to and disconnected from the working chamber substantially simultaneously with the primary intake port means, auxiliary intake port means formed in each side housing so as to open through at least one opening to each rotor cavity at the working chamber in the intake stroke and located so that it is disconnected from the same working chamber later than the primary and secondary intake port means, said auxiliary intake port means being provided with control valve means which is located adjacent the opening of the auxiliary intake port means and which closes the auxiliary intake port means under a predetermined engine load condition, and intake passage means having throttle valve means and connected with said primary, secondary and auxiliary intake port means.

2. A rotary piston engine in accordance with claim 1 including sensing means for sensing exhaust gas pressure, said control valve means operated in response to exhaust gas pressure.

3. A rotary piston engine in accordance with claim 1 in which said control valve means includes a hollow cylindrical valve member disposed for rotation about is longitudinal axis in a cylindrical bore communicating with said secondary intake port means, said valve member having aperture means which can be moved into and out of alignment with the opening of the secondary intake port means.

4. A rotary piston engine including a casing comprised of a pair of rotor housings each having a trochoidal inner wall and secured together at one side thereof with an intermediate housing disposed therebetween and a side housing secured to the other side of each rotor housing to define a rotor cavity in each of the rotor housings between the intermediate and side housings, a substantially polygonal rotor disposed in each rotor cavity for rotation with apex portions in sliding engagement with the inner wall of the associated rotor housing to define working chambers of variable volumes to conduct intake, compression, combustion, expansion and exhaust strokes, exhaust port means formed in said casing so as to open to each rotor cavity at the working chamber in the exhaust stroke, primary intake port means formed in said intermediate housing so as to open to each rotor cavity at the working chamber in the intake stroke, said primary intake port means being located so that it is opened to the working chamber after the same working chamber is substantially disconnected from the exhaust port means, auxiliary intake port means formed in each side housing so as to open through at least one opening to each rotor cavity at the working chamber in the intake stroke and located so that it is disconnected from the same working chamber later than the primary intake port means, control valve means for closing the auxiliary intake port means under a predetermined engine load condition, secondary intake port means formed in each side housing so as to open to each rotor cavity at the working chamber in the intake stroke, said secondary intake port means being located so that it is opened to the working chamber after the same working chamber is substantially disconnected from the exhaust port means and disconnected from the working chamber substantially simultaneously with the primary intake port means, first intake passage means having first throttle valve means and connected with said primary intake port means, second intake passage means having a second throttle valve means and connected with said secondary and auxiliary intake port means, said second throttle valve means being closed under a predetermined engine load condition.

5. A rotary piston engine in accordance with claim 4 in which said primary and secondary intake port means have openings to the rotor cavity which are of substantially the same configuration.

6. A rotary piston engine in accordance with claim 4 in which said first and second intake passages define a dual-barrel type carburetor means.

* * * * *